United States Patent
Lee et al.

(10) Patent No.: US 9,954,937 B2
(45) Date of Patent: Apr. 24, 2018

(54) METHOD FOR GROUPING A PLURALITY OF DEVICES AND GROUPING SYSTEM

(71) Applicant: Samsung Electronics Co., Ltd., Suwon-si, Gyeonggi-do (KR)

(72) Inventors: Jae-keun Lee, Goyang-si (KR); Jin-guk Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 14/666,838

(22) Filed: Mar. 24, 2015

(65) Prior Publication Data

US 2015/0281342 A1 Oct. 1, 2015

(30) Foreign Application Priority Data

Mar. 26, 2014 (KR) ........................ 10-2014-0035503

(51) Int. Cl.
| | |
|---|---|
| *G06F 15/16* | (2006.01) |
| *H04L 29/08* | (2006.01) |
| *G06Q 10/10* | (2012.01) |
| *G06Q 50/00* | (2012.01) |

(52) U.S. Cl.
CPC ......... *H04L 67/1002* (2013.01); *G06Q 10/10* (2013.01); *G06Q 50/01* (2013.01); *H04L 67/142* (2013.01); *H04L 67/22* (2013.01)

(58) Field of Classification Search
CPC .... G06Q 50/01; G06Q 10/10; H04L 67/1002; H04L 67/142; H04L 67/22
USPC .................................................. 709/217, 219
See application file for complete search history.

(56) References Cited

U.S. PATENT DOCUMENTS

| | | | | |
|---|---|---|---|---|
| 2010/0262924 | A1 | 10/2010 | Kalu | |
| 2011/0016399 | A1* | 1/2011 | Yasrebi | H04L 12/588 715/734 |
| 2012/0150960 | A1* | 6/2012 | Nalawade | G06Q 30/02 709/204 |
| 2012/0208462 | A1* | 8/2012 | Lee | H04W 8/005 455/41.2 |
| 2012/0246244 | A1* | 9/2012 | Mallet | G06Q 50/01 709/206 |
| 2013/0185359 | A1* | 7/2013 | Liu | H04L 67/24 709/204 |
| 2014/0172996 | A1* | 6/2014 | Deeter | H04L 51/24 709/206 |
| 2014/0359018 | A1* | 12/2014 | Sun | G05B 15/02 709/204 |
| 2015/0264723 | A1* | 9/2015 | Cheng | H04W 76/02 455/41.2 |

(Continued)

FOREIGN PATENT DOCUMENTS

| | | |
|---|---|---|
| KR | 10-2011-0015068 A | 2/2011 |
| KR | 10-2013-0062442 A | 6/2013 |
| WO | 20121000169 A1 | 1/2012 |

*Primary Examiner* — Philip B Tran
(74) *Attorney, Agent, or Firm* — Jefferson IP Law, LLP

(57) ABSTRACT

A grouping method of User Equipment (UE) is provided. The grouping method includes transmitting, to a server, relational data stored in the UE using a first communication mode, and receiving, from the server, generated group information based on relational data of a plurality of UEs, wherein, in response to the first communication mode being unusable, communication is performed using a second communication mode.

20 Claims, 13 Drawing Sheets

(56) References Cited

U.S. PATENT DOCUMENTS

2015/0264731 A1* 9/2015 Lin .................. H04L 67/26
                                                      455/41.2

\* cited by examiner

METHOD FOR GROUPING A PLURALITY OF DEVICES AND GROUPING SYSTEM

CROSS-REFERENCE TO RELATED APPLICATION(S)

This application claims the benefit under 35 U.S.C. § 119(a) of a Korean patent application filed on Mar. 26, 2014 in the Korean Intellectual Property Office and assigned Serial number 10-2014-0035503, the entire disclosure of which is hereby incorporated by reference.

TECHNICAL FIELD

The present disclosure relates to a social network service. More particularly, the present disclosure is directed to a grouping method and a grouping system enabling a grouping of a plurality of UEs that reflects social relations in the real world.

BACKGROUND

In the endeavors of social networking technology, there are related art approaches to generate groups among mobile terminals for chatting and for sharing contents uploaded to a Social Network Service (SNS) webpage.

These approaches attempt to reflect social relations among users in a network in order to facilitate communication in the network according to social relations. However, these approaches are limited in accurately reflecting the social relations among users in the real world. In particular, these approaches fail to reflect both the physical distance and the social relation of users in the real world.

Further, these approaches merely allow a user to leave a comment on a webpage or to web chat, thus permitting on-line activities but failing to reflect the activities of users in the real world.

Therefore, there exists a need in the art for a new on-line service technology that can augment the activities of users in the real world, while reflecting both the physical distance and the social relation among users in the real world.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and provide at least the advantages described below. Accordingly, an aspect of the present disclosure is to provide a grouping method and a grouping system of a plurality of User Equipment (UE) which provide a new on-line service technology that can improve the activities of users in the real world, while reflecting both the physical distance in the real world and the social relation among users in the real world.

In accordance with an aspect of the present disclosure, a grouping method of a plurality of UEs is provided. The method includes transmitting, to a server, relational data stored in the UE using a first communication mode, and receiving, from the server, generated group information based on relational data of a plurality of UEs, wherein, in response to the first communication mode being unusable, communication is performed using a second communication mode.

In this case, the connecting of the plurality of devices may assign priority among a plurality of communication means and may sequentially try connection.

Further, the communication means may be a short distance communication means.

Data stored in the plurality of devices may be data included in at least one of phone contacts, call logs, Short Message Service (SMS) logs, a Social Network Service (SNS) friend list, and the like.

In this case, data stored in the plurality of devices may be data included in at least one of an SNS log and internet search history.

The aforementioned grouping method may further include generating a new group, when any device is degrouped from the generated group, or a new device is included.

In addition, the grouping method may further include providing a web page to access devices included in the generated group, and posting contents on the web page through the devices included in the generated group.

In this case, the devices included in the generated group may compress the contents differently according to communication means used for connecting the plurality of devices and post the contents on the web page.

The content may be at least one of photo content, video content, game content, text message, voice content, and the like.

In addition, by analyzing a log of the devices included in the generated group through the web page, place information or content information may be recommended.

The above described grouping method may further including analyzing position information of devices included in the generated group and providing the devices with data related to the position information of the devices.

In accordance with another aspect of the present disclosure, a grouping system is provided. The grouping system includes a display, a communicator configured to transmit relational data stored in the UE using a first communication mode, and a controller configured to control to receive from a server group generated information based on relational data of a plurality of UEs, and, in response to the first communication mode being unusable, to perform communication using a second communication mode.

In this case, the plurality of devices may assign priority among a plurality of communication means and may subsequently try connection among the communication means.

Further, the communication means may be a short distance communication means.

The data stored in the plurality of devices may be data included in at least one of phone contacts, call logs, SMS logs, an SNS friend list, and the like.

The server may generate a new group, when any device is degrouped from the generated group, or a new device is included in the group.

Further, the server may provide the devices a web page accessible from the devices included in the generated group, and post on the web page contents through the devices included in the generated group.

Further, the devices included in the generated group may compress the contents differently according to communication means used to connect the plurality of devices, and post the contents on the web page.

The contents may be at least one of photo content, video content, game content, text message, voice content, and the like.

Further, the server may analyze a log of devices included in the generated group through the web page and recommend price information or content information.

Accordingly, according to the various embodiments, the present disclosure provides a grouping method and a grouping system of a plurality of devices, the method and the system provides a new type on-line service technology that can promote activities of users in the real world, while reflecting physical distance of the real world and social relation among users.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
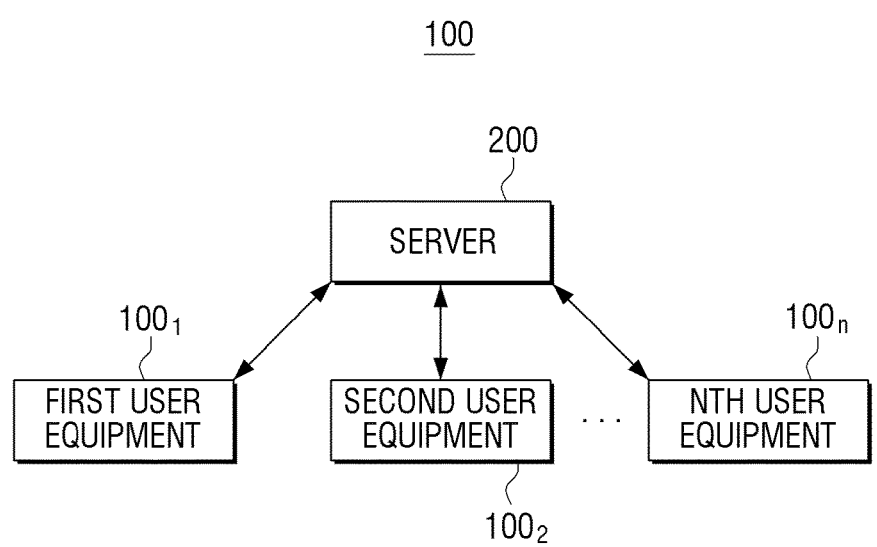
FIG. 1 is view illustrating a configuration of a grouping system according to an embodiment of the present disclosure.

FIG. 1 is a view illustrating a configuration of a grouping system according to an embodiment of the present disclosure.

Figure 2:
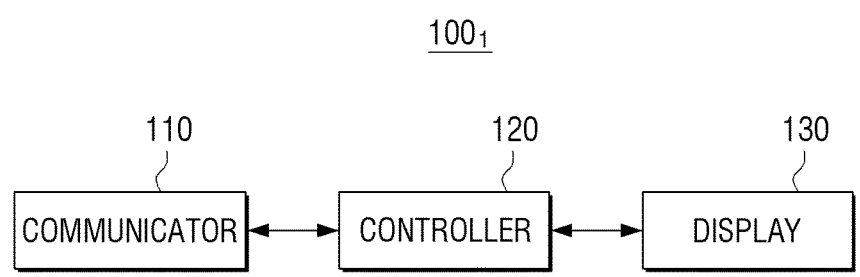
FIG. 2 is a block diagram illustrating the configuration of a User Equipment (UE) according to an embodiment of the present disclosure.

FIG. 2 is a block diagram illustrating a configuration of a first User Equipment (UE) $100_1$ according to an embodiment of the present disclosure.

Figure 3:
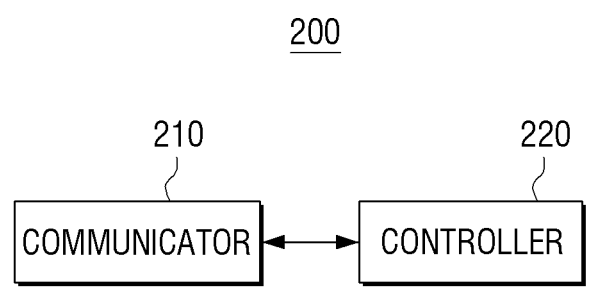
FIG. 3 is a block diagram illustrating a configurations of a server according to an embodiment of the present disclosure.

FIG. 3 is a block diagram illustrating a configuration of a server according to an embodiment of the present disclosure.

Referring to FIG. 1, the grouping system 100 includes a first UE $100_1$, a second UE $100_2$ ... an $n^{th}$ UE $100_n$, and the server 200.

The first UE $100_1$ communicates with the server 200 and adjacent UEs $100_2$, ... $100_n$. The first UE $100_1$ includes a communicator 110, a controller 120, and a display 130.

The communicator 110 communicates with the server 200 or other UEs $100_2$, ... $100_n$. The communicator 110 searches for other UEs $100_2$, $100_3$, ... $100_n$ of an adjacent area as described herein. In this case, a priority may be set to a plurality of communication modes and a connection may be sequentially tried with other UEs $100_2$, $100_3$, ... $100_n$.

For this, the communicator 110 includes various communication modules. In an embodiment, the communicator 110 includes a near field communication module.

The communicator 110 includes WiFi communication module (not shown). The WiFi communication module performs near field communication according to the IEEE 802.11 specification. According to the IEEE 802.11 specification, single carrier Direct Sequence Spread Spectrum (DSSS) and multi-carrier Orthogonal Frequency Multiplexing (OFDM) may be used.

The communicator 110 may further include mobile communication modules (not shown) which can be embodied in various ways. That is, a cellular communication module that enables data reception and transmission by using a wireless phone network may be included. For example, Third Generation (3G) mobile communication technology may be applied. That is, at least one among Wideband CDMA (WCDMA), High Speed Downlink Packet Access (HSDPA), High Speed Uplink Packet Access (HSUPA), and High Speed Packet Access (HSPA) may be applied.

A Fourth Generation (4G) mobile communication module may be included, and a 2.3 GHz (portable internet) mobile WiMAX or WiBro module may be included for high speed communication (all not shown).

Further, a 4G Long Term Evolution (LTE) module may be included (not shown). LTE is an expansion technology of WCDMA and is based on Orthogonal Frequency Division Multiple Access (OFDMA) and Multiple-Input Multiple-Output (MIMO) antennas. WCDMA technology is advantageous in that the existing network may be utilized.

In addition, other near field communication modules (not shown) such as a Bluetooth module, an Infrared Data Association (IrDA) module, a Near Field Communication (NFC) module, a Zigbee module, and a wireless LAN module may be included.

The controller 120 controls overall operations of the first UE $100_1$. The controller 120 may include hardware configurations of a Micro Processing Unit (MPU) or a Central Processing Unit (CPU), a Cache Memory, a Data Bus, and software configurations such as an operating system. According to a system clock, control commands with respect to each element for operation of the first UE $100_1$ are read from a memory of the controller 120, an electrical signal is generated in accordance with the read control command, and consequently each element of hardware is operated.

In particular, the controller 120 controls communicator 110 to transmit to the server 200 relational data information such as phone contacts, call logs, Short Message Service (SMS) logs, a Social Network Service (SNS) friend list, an SNS log, and an internet search history which are stored in the storage (not illustrated) of the first UE $100_1$ to be used in grouping.

Further, the controller 120 may receive from the server 200 group information generated based on relational data of a plurality of UEs $100_1$, $100_2$, . . . $100_n$, and if a first communication mode is not usable, may control the communicator 110 to perform communication using a second communication mode.

Further, the server 200, when any UE is degrouped from the generated group or a new UE is connected to the server 200, a new group is generated based on relational data among the UE, and in this case, the controller 120 controls to receive information of a newly-generated group.

The controller 120 controls the communicator 110 to receive a web page accessible from the UEs $100_1$, $100_2$, . . . $100_n$ included in the generated group. In addition, the controller 120 controls the display 130 to display the received web page.

In an embodiment, the controller 120 controls the communicator 110 to upload to the web page at least one of photo content, video content, game content, text message and voice content.

Further, the controller 120 controls to compress contents differently according to a communication mode used by the first UE $100_1$. The controller 120 controls the communicator 110 to analyze logs of the UEs $100_1$, $100_2$, . . . $100_n$ included in the generated group and receives position information or content information.

The controller 120 controls the communicator 110 to transmit to the server 200 position information, and receive from the server 200 data related to position information of the plurality of UEs $100_1$, $100_2$, . . . , $100_n$. Detailed operations of the UE $100_1$ according to the operations of the controller 120 will be explained in greater detail later.

The display 130 displays various display objects.

The display 130 may be realized as various display technologies such as Organic Light Emitting Diodes (OLED), a Liquid Crystal Display Panel (LCD Panel), a Plasma Display Panel (PDP), a Vacuum Fluorescent Display (VFD), a Field Emission Display (FED), and an Electro Luminescence Display (ELD). Further, the display may be realized as a flexible display, a transparent display, or the like.

In particular, the display 130 displays a web page received from the server 200, and displays place information or content information received from the server 200.

In addition, though not illustrated in the drawing, the first UE 100 may further include a Global Positioning System (GPS) module (not shown) to obtain position information of the first UE 100. Moreover, various position detection modules may be included.

The second UE $100_2$ to $n^{th}$ UE $100_n$ have a configuration and function similar to the first UE $100_1$, and thus will not be further detailed.

The first UE $100_1$, and the second UE $100_2$ to $n^{th}$ UE $100_n$ may be realized as various mobile UEs. For example, each UE may be realized as at least one of a smartphone, a tablet PC, a smart watch, smart glasses, a Portable Media Player (PMP), an MP3 player, a Personal Digital Assistant (PDA), a cell phone, a lap top computer, or other portable terminals.

Referring to FIG. 3, the server 200 includes the communicator 210 and the controller 220.

The communicator 210 may be realized with various communication modes. The communicator 210 may be realized with the aforementioned NFC mode and mobile communication mode, but when the server 200 is connected with an internet service provider, the communicator 210 may employ TCP/IP.

The controller 220 controls overall operations of the server 200.

In particular, the controller 220 controls the communicator 210 to receive relational data from a plurality of terminal UEs $100_1$, $100_2$, . . . $100_n$ including the first UE $100_1$, the second UE $100_2$.

In addition, based on the received relational data, the controller 220 generates a group including a plurality of UEs $100_1$, $100_2$, . . . $100_n$. The controller 220 also controls to transmit information related to the generated group to each UE.

Further, when a member of a group changes, i.e., as any UE is degrouped from the generated group or a new UE is connected to the server, the controller 220 is configured to generate a new group based on relational data of the connected UEs. In addition, the controller 220 is configured to control to transmit information on a generated new group to a plurality of UEs $100_1$, $100_2$, . . . $100_n$.

The controller 220 is configured to control to transmit a web page accessible from the UEs $100_1$, $100_2$, . . . $100_n$ to each UE $100_1$, $100_2$, . . . , $100_n$.

Further, the controller 220 analyzes a log of the UEs $100_1$, $100_2$, . . . $100_n$ included in the generated group and provide place information or content information.

The controller 220 may receive position information of each UE $100_1$, $100_2$, $100_3$, . . . $100_n$, and perform grouping among UEs which are positioned within a preset distance based on received position information. In addition, the controller 220 controls the communicator 210 to transmit the generated group information to each UE $100_1$, $100_2$, $100_3$, . . . $100_n$.

Functions of the controller 220 are described in greater detail below.

The server 200 includes one or more databases (not illustrated) to provide the above-described various services.

Database may be one of, but not limited to, a Hierarchical DataBase (HDB), Relational DataBase (RDB), and Object-Oriented DataBase (OODB). When a database is established in a separate server, it is also possible to realize the database as Network DataBase (NDB) aside from the above said databases.

Further, the database may be established as a cloud format. A cloud has no limitation in type, for example, a cloud may be implemented as a private cloud or a public cloud.

The server 200 may include a general purpose computer. That is, the server 200 may include a CPU having the capability to control a peripheral memory, a cache memory, a RAM memory, a hard disk, a Blu-ray disk, input/output devices, a monitor and a touch screen, various wired/wireless communication modules, HDMI modules, and hardware such as a data bus, as well as an application which may perform functions of the above-described controller 220, framework, and operating system.

Hereinafter, a grouping method of a plurality of UEs according to various embodiments will be explained. For convenience, the first UE $100_1$ is described, but the same description may be applied to other UEs $100_2, \ldots 100_n$.

Figure 4:
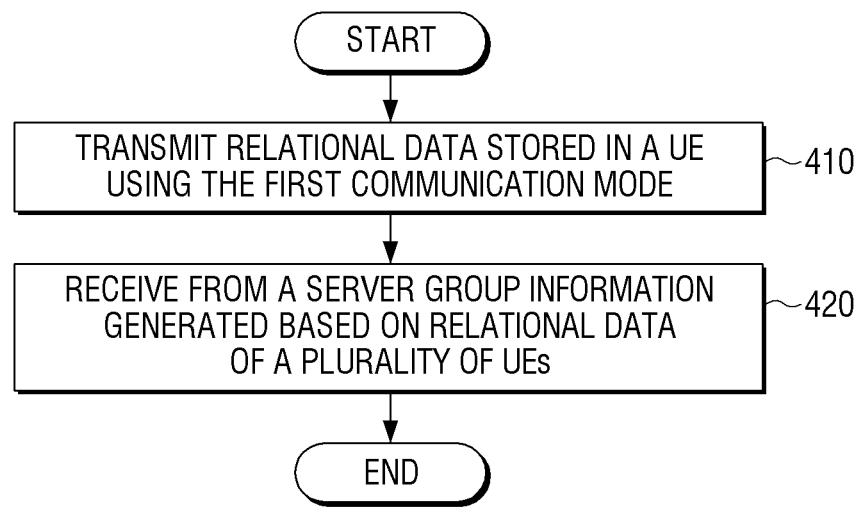
FIGS. 4 and 5 are flowcharts of a grouping method of a UE according to various embodiments of the present disclosure.
Figure 5:
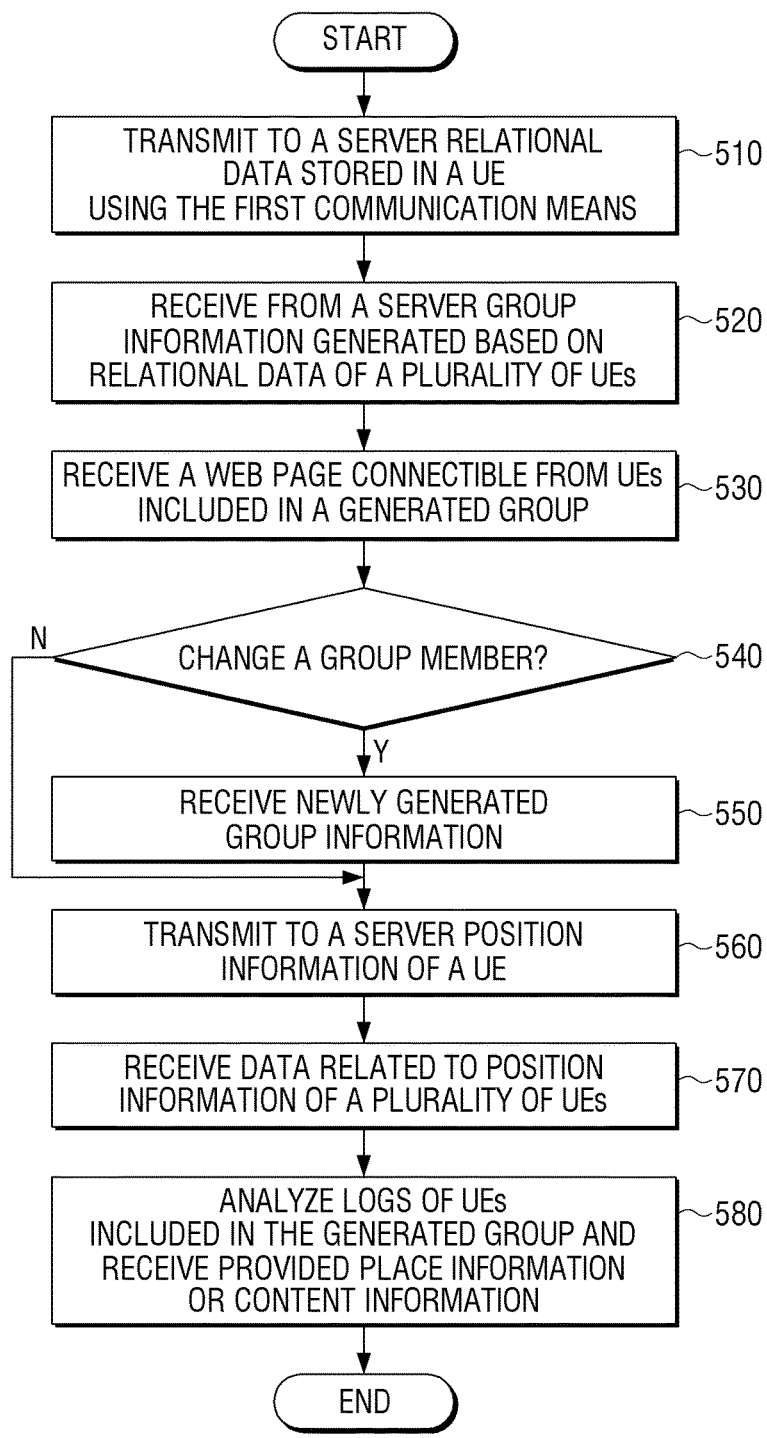

FIGS. 4 and 5 are flowcharts of a grouping method of a UE according to various embodiments of the present disclosure.

Referring to FIG. 4, a grouping method of a UE according to an embodiment includes transmitting to a server relational data stored in the UE using the first communication mode in operation 410 and receiving from a server information of a group generated based on relational data of a plurality of UEs in operation 420. In this case, when the first communication mode is not usable, communication may be performed by using a second communication mode.

In operation 410, the first UE $100_1$ searches for other UEs $100_2, 100_3, \ldots 100_n$ or the server 200 by using near field communication means. At this time, first UE $100_1$ may assign priority among a plurality of communication means and try connection with other UEs $100_2, 100_3, \ldots 100_n$ or the server 200. In addition, the UE transmits to the server 200 relational data by using the set communication means.

Figure 6:
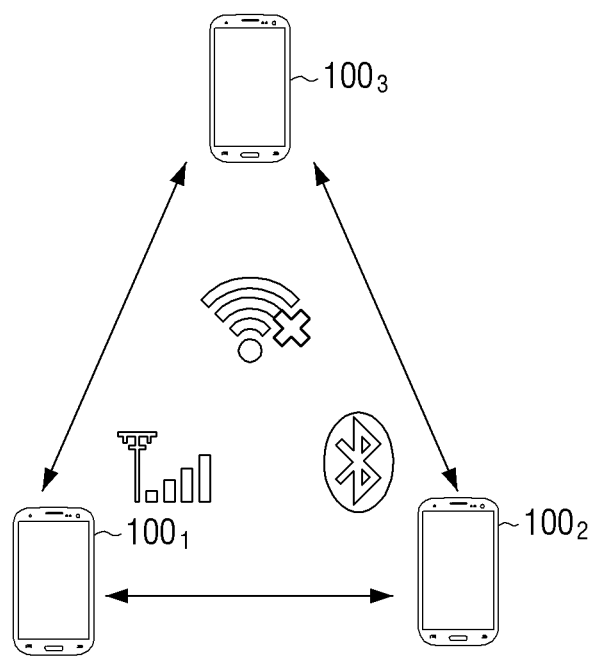
FIG. 6 is a reference diagram illustrating a method of interconnecting a plurality of devices according to an embodiment of the present disclosure.

FIG. 6 is a reference diagram illustrating a method for interconnecting a plurality of UEs according to an embodiment of the present disclosure.

As illustrated in FIG. 6, according to an embodiment, connection with other UEs $100_2, 100_3, \ldots 100_n$ or the server 200 may be tried sequentially by using mobile communication modules (not shown) such as WiFi, 3G, 4G and Bluetooth modules. When connection is successful by WiFi, other communication means are not used for connection. However, if WiFi is failed, a mobile communication network is accessed to try connection. If it is not easy to connect via the mobile communication network, other UEs $100_2, 100_3, \ldots 100_n$ or the server 200 are connected by using a Bluetooth module.

In this case, the first UE $100_1$ is connected with only other UEs $100_2, 100_3, \ldots 100_n$ which are within a range of predetermined distance, but is not connected with the UEs which are not within the range of predetermined distance.

In the aforementioned embodiment, it is described that a plurality of UEs $100_1, 100_2, 100_3, \ldots 100_n$ are interconnected, but, technically, the server 200 may group UEs $100_1, 100_2, 100_3, \ldots 100_n$ in a specific area. When each UE $100_1, 100_2, 100_3, \ldots 100_n$ transmits to the server 200 position information, the server 200 may group UEs positioned within a predetermined distance between the received position information. Further, the server 200 may notify the grouping information to each UE $100_1, 100_2, 100_3, \ldots 100_n$.

Each UE $100_1, 100_2, 100_3, \ldots 100_n$ may identify a device connected to the UE through information received from the server 200.

Any of a plurality of devices $100_1, 100_2, 100_3, \ldots 100_n$ may substitute the role of the server 200. In other words, a UE $100_m$, from among a plurality of UEs $100_1, 100_2, 100_3, \ldots 100_n$, may receive from each UE $100_1, 100_2, 100_3, \ldots 100_n$ position information, and group the UEs positioned within a predetermined distance based on received position information.

In one embodiment, grouping by the server 200 is described. However, in another embodiment, grouping may be by a host UE $100_m$, that is one of a plurality of UEs $100_1, 100_2, 100_3, \ldots 100_n$.

Figure 7:
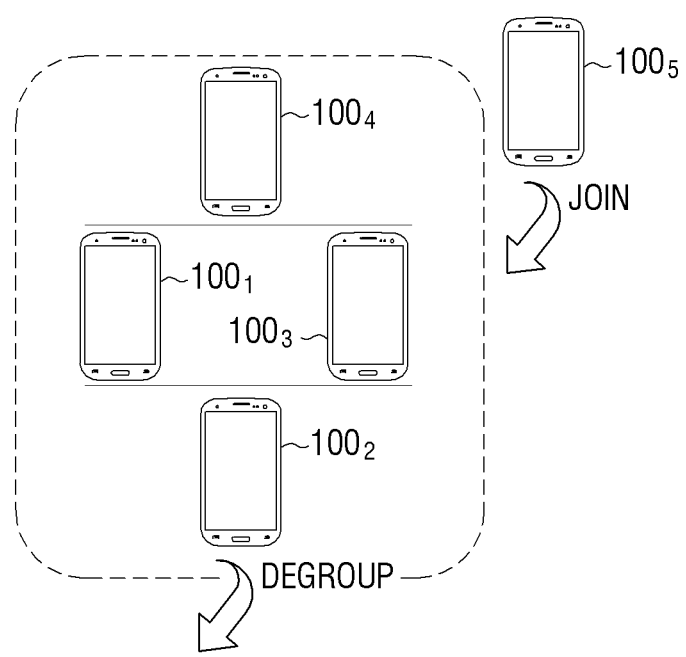
FIG. 7 is a view illustrating a change of a group according to an embodiment of the present disclosure.

FIG. 7 is a view illustrating a change in a group according to an embodiment of the present disclosure.

As illustrated in FIG. 7, a new UE $100_5$ may join a group including a plurality of UEs $100_1, 100_2, 100_3, 100_4$. Further, the existing UE $100_2$ may be degrouped.

As such, a group may change flexibly, but too-frequent changes of a group (joining and leaving of group members) may cause problems; thus, group members need to exist in a corresponding group for a predetermined time to be members of the group.

Accordingly, generating the group may be done among the UEs which maintain a connection state for a time which is equal to or greater than a predetermined time, from among the plurality of UEs $100_1, 100_2, 100_3, \ldots 100_n$ which are interconnected using the communication mode.

The server 200 generates a group when a plurality of UEs $100_1, 100_2, 100_3, \ldots 100_n$ exist within a preset scope, and maintain a connection state for a certain period of time. In addition, when a UE is degrouped from a group, for example, if distance with other UEs exceeds a predetermined scope, only when the state is maintained for a certain time or longer, degrouping from the group is available. When the UE is out of the predetermined scope of distance for a time shorter than the predetermined time and then is positioned again with in the preset scope, the connection state is maintained.

For example, when a UE included in the group is out of the preset positional scope from the other UEs and then is positioned within the preset scope again within one minute, which is a preset time, the connection state with other UEs included in the group is maintained. However, when one minute is exceeded while the UE is out of the preset scope, it may be considered as degrouping from the group.

As illustrated, when a plurality of UEs $100_1, 100_2, 100_3, 100_4$ form a group, or when another UE $100_5$ approaches a preset scope, the terminal UEs may be grouped in the same group only when the UEs are within a preset range for a predetermined time. The server 200 notifies a plurality of UEs $100_1, 100_2, 100_3, 100_4$ which form one group that new UE $100_5$ is included.

At operation 420, the server 200 receives relational data stored in a plurality of UEs $100_1, 100_2, \ldots 100_n$ and generates a group including the plurality of UEs $100_1, 100_2, \ldots 100_n$. Relational data includes data which indicates social relation among users of the plurality of UEs $100_1, 100_2, \ldots 100_n$. For example, phone contacts, call logs, SMS logs, and an SNS friend list may be included. The method groups users by utilizing various context information included in each UE. By using phone contacts, calling logs, SMS logs, and SNS log data, relation of the members may be identified, and a group among close people may be generated by using the information.

Figure 8:
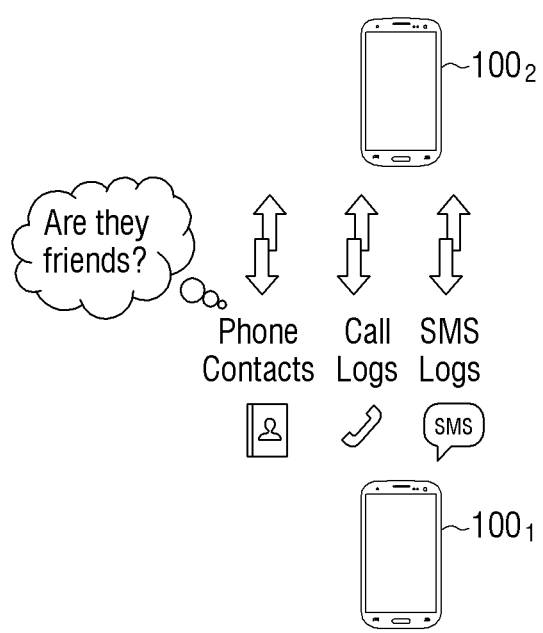
FIG. 8 is a reference diagram illustrating a grouping method according to an embodiment of the present disclosure.

FIG. 8 is a reference diagram illustrating a method for grouping according to an embodiment of the present disclosure.

As illustrated in FIG. 8, the server 200 receives from each UE $100_1$, $100_2$, ... $100_n$ calling history, phone contacts, calling logs, SMS logs, and other relational data. Then, by analyzing the information, highly-relevant UEs $100_1$, $100_2$ are grouped in a group. Further, the group information is known to the UEs $100_1$, $100_2$.

By determining degree of connection and closeness among users of the UE, various groupings are available. For example, degree of closeness can be determined depending on whether there are at least three phone calls, or whether there have been calls within recent three months, and grouping is available according to degree of closeness.

Further, grouping is available based on interests of users in adjacent spaces. To do this, data stored in the plurality of UE $100_1$, $100_2$, ... $100_n$ may be data included in at least one of SNS log and internet search history.

As an embodiment, by grouping members of a company who like tennis, a group may be recommended. The server 200, from each UE $100_1$, $100_2$, ... $100_n$ or the user terminals already included in a group, receives schedule history, SNS history, and internet surfing history, and extracts a keyword. A group may be generated among the UEs of which keywords are matched with each other. Further, generated group information is provided to each UE $100_1$, $100_2$, ... $100_n$.

Further, the server 200 may find out common interests from among the people in the adjacent space, and recommend a suitable group. For example, though not included in a group formed among the UEs of the people who are interested in figure skating, information of the group may be provided to the UE of an outside user who is also interested in figure skating.

The server 200, by simultaneously performing the above-mentioned grouping, may generate a plurality of groups among the user terminals positioned in the adjacent space. That is, the server 200 may perform a plurality of grouping for one UE, and divide user terminals positioned in adjacent positions into different groups based on relational data. In the aforementioned embodiment, the server 200 may generate a first group among the UEs with high closeness according to calling log, and may include the UE into a second group of the UE users having the same interests, by analyzing SNS logs, etc. Meanwhile, the server 200, maintains the existing group without degrouping existing groups when a new group is generated, as a new group may be different from the existing groups in terms of the members of the group, and social relation among the group members may be different. This is the same in case when a new group is formed when members are degrouped from the existing group, or in case when a new group is formed when new members join the existing group. The characteristics of a group may be changed due to joining of new members or degrouping by existing members, and thus the existing group and a new group are separately managed and maintained.

FIG. 5 illustrates a flow chart according to an embodiment of the present disclosure.

Referring to FIG. 5, a grouping method of a UE according to another embodiment of the present disclosure includes transmitting to a server relational data stored in the UE using the first communication mode in operation 510 and receiving from a server the generated group information based on relational data among the plurality of UEs in operation 520.

Operations 510 and 520 are the same as the aforementioned 410 and 420, and thus their description will be omitted.

At operation 530, the server 200 provides a web page accessible from the UEs $100_1$, $100_2$, ... $100_n$ of the generated group, and the UE $100_1$ that receives the web page displays it on display 130. Users of each UE $100_1$, $100_2$, ... $100_n$, may post contents on the web page through the UEs $100_1$, $100_2$, ... $100_n$ included in the generated group.

The content may be one of photo content, video content, game content, text message, and voice content.

Figure 9:
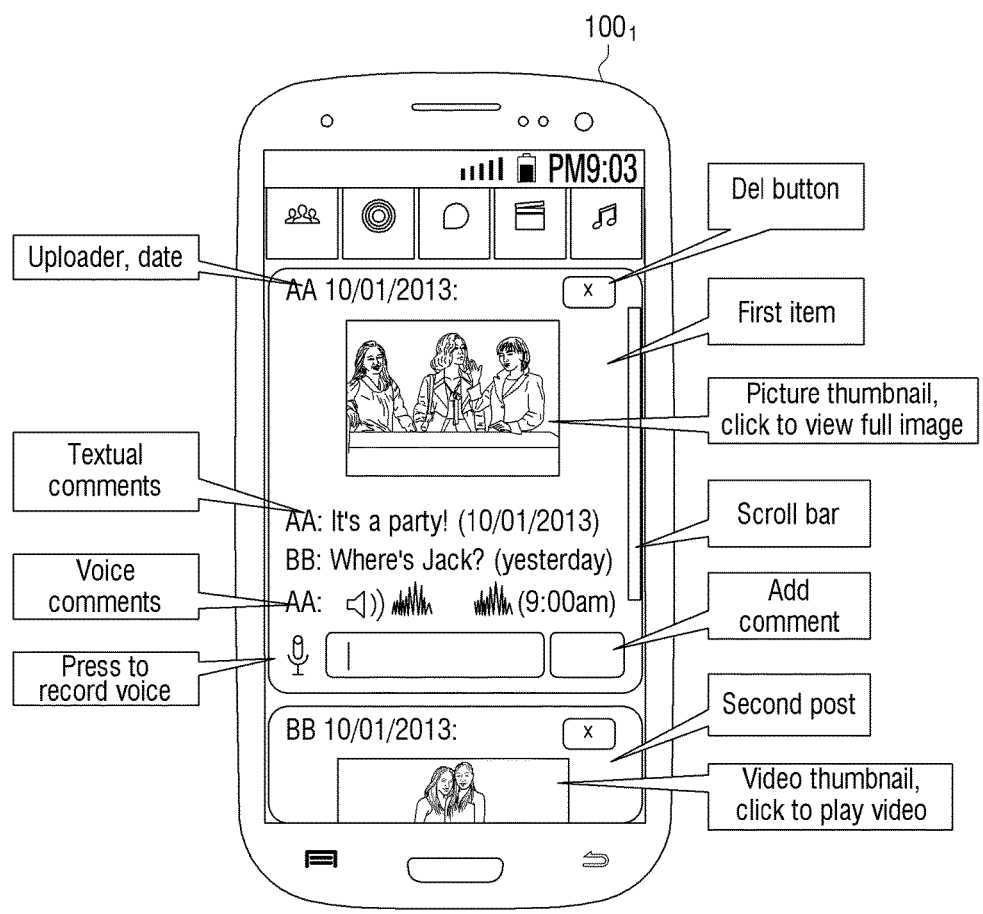
FIG. 9 is a view illustrating a screen providing a webpage according to an embodiment of the present disclosure.

FIG. 9 is a view illustrating a screen providing a web page according to an embodiment of the present disclosure.

The web page provided according to an embodiment in FIG. 9 provides information from at least one of text comment, voice comment, upload date, and image data. Information may be posted by users through their own UEs, or the server 200 may provide information itself. The same web page is provided to a plurality of UEs $100_1$, $100_2$, ... $100_n$, and information on the web page is shared by multiple UEs $100_1$, $100_2$, ... $100_n$.

Referring again to FIG. 5, at operation 540 when a new UE joins the existing group, the server 200 may generate a new group different from existing groups in operation 550. As described above, a new UE may join the existing group. In this case, approval for a UE included in the existing group may be necessary. As described above, the server 200, when a new UE joins the existing groups, generates a new group different from existing groups. In addition, the existing groups are maintained.

The present disclosure is based on real world relations among the users of the adjacent UEs $100_1$, $100_2$, ... $100_n$, and thus, when a new user joins the existing groups, a new real world relation may be different from the existing real world relations. Accordingly, when a UE of a new user joins a group, a group consisting of new members is generated. In this case, the existing groups are maintained without being degrouped (dissolved).

Figure 10:
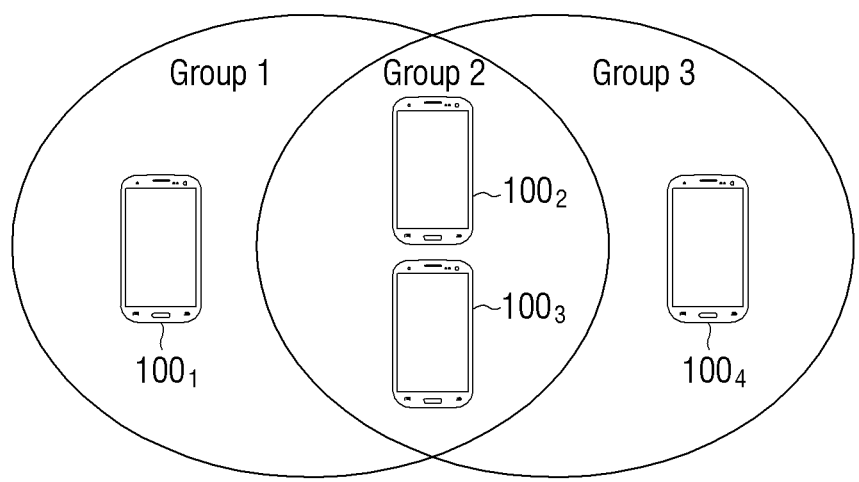
FIG. 10 is a reference diagram illustrating a grouping method according to an embodiment of the present disclosure.

FIG. 10 is a reference diagram illustrating a grouping method according to an embodiment of the present disclosure.

As illustrated in FIG. 10, a plurality of UEs $100_1$, $100_2$, $100_3$ included in the first group, the UEs $100_2$, $100_3$ included in the second group, and the UEs $100_2$, $100_3$, $100_4$ included in the third group may be different. When a new UE $100_4$ intends to join the first group, the first group is maintained, and new group 4 including the entire UEs $100_1$, $100_2$, $100_3$, $100_4$ may be generated.

It is the same when a UE is degrouped from the group, and when a UE $100_4$ belonging to a group with UEs $100_2$, $100_3$, $100_4$ is degrouped, a group constituting the degrouped and remaining UEs may be a group which is entirely different from the existing groups.

As such, a group may be entirely changed according to the configurations of the group members, as interests, available activities, and the scope of exposure of private lives may be different according to the members. A photo which needs to be shown to A and B only should not be exposed in a group including C. Therefore, such activity should be exposed in a group constituting of only A and B.

The UEs $100_1$, $100_2$, ... $100_n$ included in the generated group may differently compress the contents according to communication means used to connect the plurality of UEs $100_1$, $100_2$, ... $100_n$ and post the contents on the web page. According to the communication modes, bandwidth may be different, and thus, contents may be compressed using different methods according to communication modes used for connection.

The UE $100_1$ transmits to server position information of UE $100_1$ in operation 560. As described above, UE $100_1$ has a location detection means such as a GPS module, and thus, detects real-time position information of UE $100_1$ and transmits the information to server 200.

The server 200, when the plurality of UEs $100_1$, $100_2$, . . . $100_n$ are at a specific position, provides data related to position information of the plurality of UE $100_1$, $100_2$, . . . $100_n$. The plurality of UEs $100_1$, $100_2$, . . . $100_n$ including the UE $100_1$ receive the information in operation 570.

Figure 11:
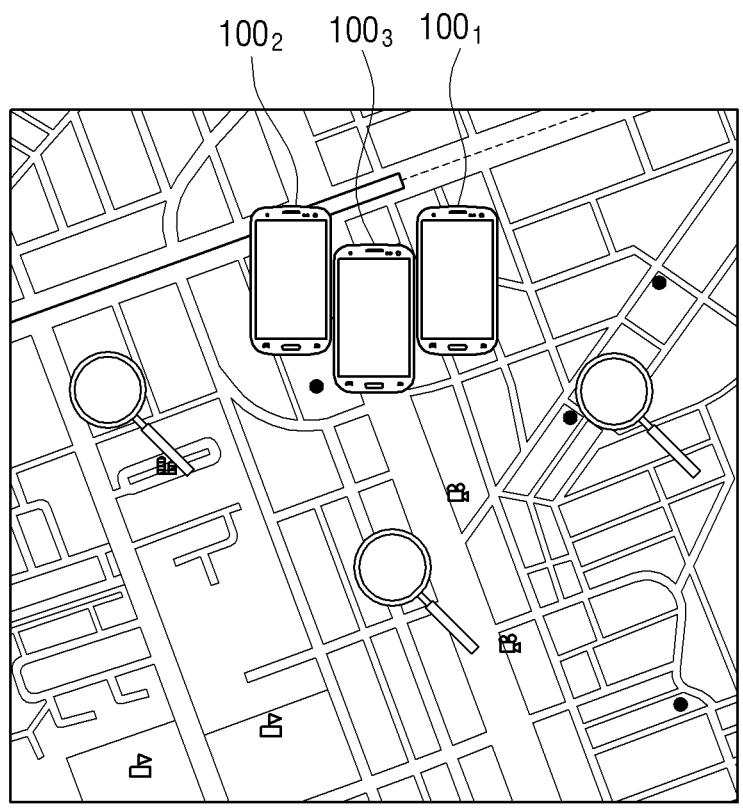
FIG. 11 is a view illustrating a scenario of providing data related to position information according to an embodiment of the present disclosure.
Figure 12:
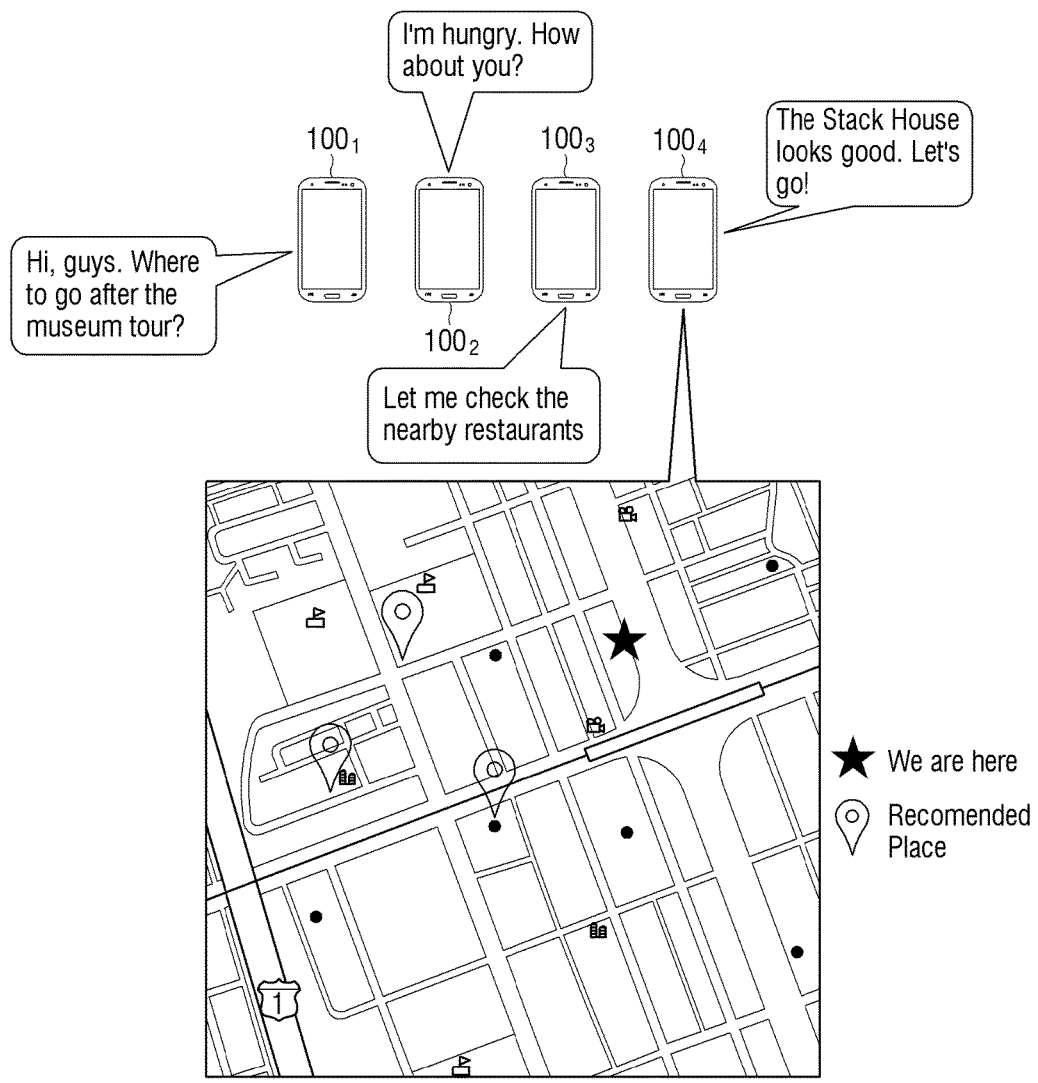
FIG. 12 is a view illustrating a scenario of recommending and providing data related to position information according to an embodiment of the present disclosure.

FIG. 11 is a view illustrating a scenario providing data related to position information according to an embodiment of the present disclosure, and FIG. 12 is a view illustrating a scenario of recommending and providing data related to position information according to an embodiment of the present disclosure.

Referring to FIG. 11, the plurality of UEs $100_1$, $100_2$, $100_3$ included in the same group transmit to the server position information, and the server 200, based on the received position information, may provide the related data to each UE $100_1$, $100_2$, $100_3$.

In particular, the server 200 may recommend information related to the position information to each of UEs $100_1$, $100_2$, . . . $100_n$. Server 200 may recommend position information by analyzing logs $100_1$, $100_2$, and $100_3$ of the UEs included in the generated group through the web page.

Further, the server 200 may analyze logs of the UEs $100_1$, $100_2$, . . . $100_n$ included in the generated group and provide place information or content information to the UE $100_1$, and the UE $100_1$ may receive and display the information at operation 580.

As illustrated in FIG. 12, logs of group members may be collected and a desired place may be recommended. By analyzing positions of group members and comments, photos, or videos which the members leave, a commonly-interested type of place and position is analyzed and recommended.

Further, the server 200 may analyze the logs $100_1$, $100_2$, . . . $100_n$ of the UEs included in the generated group through the web page, and recommend content or other information.

That is, by analyzing multimedia use history or SNS history in the UEs $100_1$, $100_2$, . . . $100_n$, information on a commonly-preferred genre, actor, or singers may be extracted, and multimedia may be recommended. This includes a recommendation of the most suitable movie from among the currently-released movies, TV programs, or suitable music.

In addition, by analyzing logs of users, information of multimedia genre, actors, and singers may be found out, and common parts may be recommended. Logs may be combined by utilizing comments in SNS or logs of various services provided in the present disclosure. Further, information regarding multimedia may be utilized by making a metadata database.

For example, each user may input the user's mood state by using their own UE. The server 200 may recommend a movie commonly to a group after analyzing comments on the movie that the user uploads to the SNS and the input mood state.

In addition, by using the logs of group members in a similar manner as the above, interests may be detected and topics may be recommended accordingly. Users may have discussions or conversations with the recommended topic.

Figure 13:
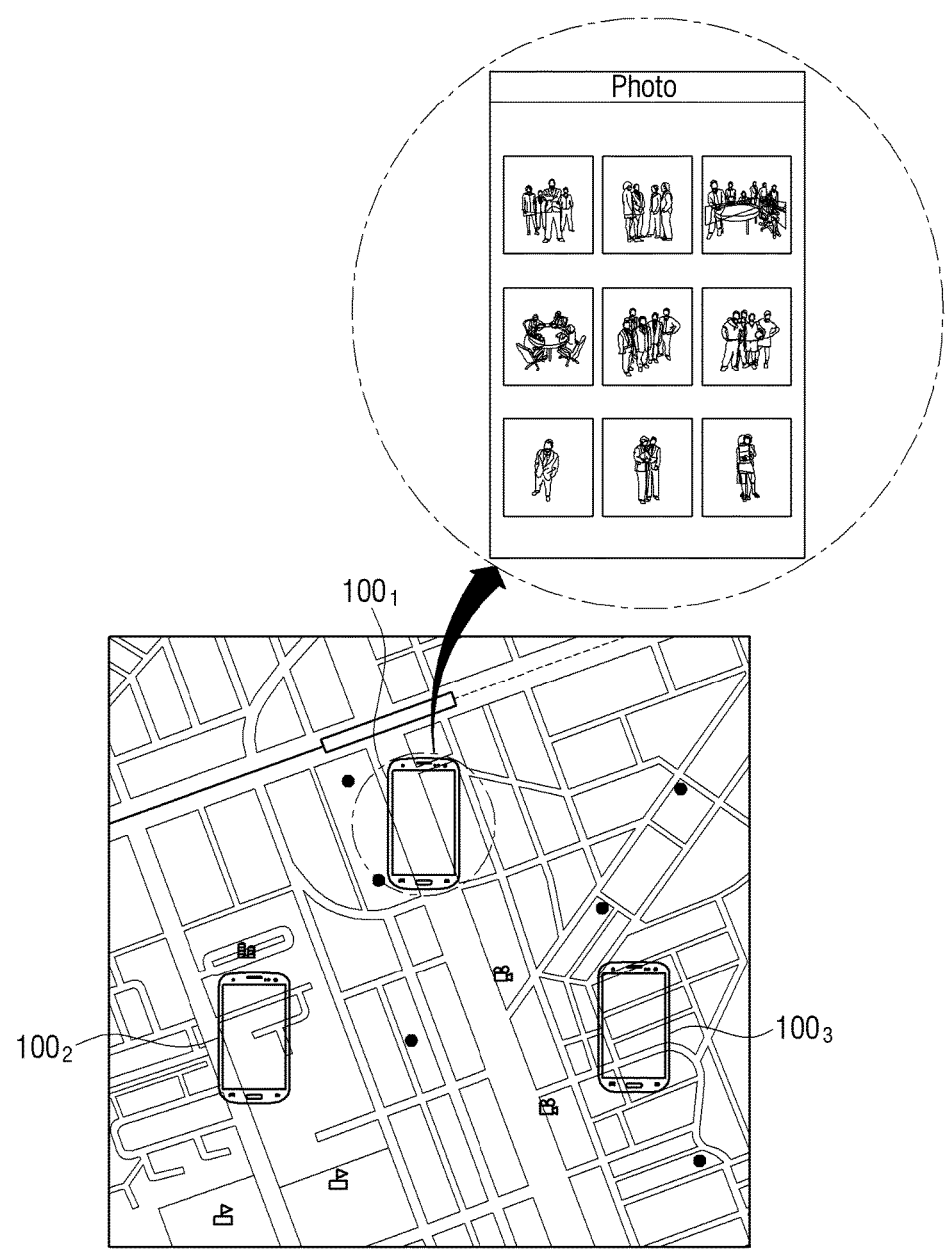
FIG. 13 is a view illustrating a scenario of providing data related to position information according to an embodiment of the present disclosure.

FIG. 13 is a view illustrating a scenario of providing data related to position information according to embodiment of the present disclosure.

Referring to FIG. 13, server 200 may provide past contents related to position of the UEs $100_1$, $100_2$, . . . $100_n$ included in the group. That is, when users of the UEs did various activities at a specific place, images or photos are provided to a UE visiting that place.

Each UE $100_1$, $100_2$, . . . $100_n$ provides position information to the server 200, and when contents related to the common position information from the past are stored in the server 200, the server 200 provides the contents again. This feature, by improving security or rarity of the contents related to the group, enables activation of realistic gathering of the group. Of course, the server 200 may provide the contents regardless of the position by user setting.

Referring to FIG. 13, when the plurality of UEs $100_1$, $100_2$, $100_3$ belonging to one group visit a specific place, the server 200 provides an image photographed in that place to each UE $100_1$, $100_2$, $100_3$.

A group in the present disclosure is based on on/offline proximity, and thus, the above-described grouping method and content providing method may reflect realistic social relation and activate various offline gatherings.

The above-described grouping method may be stored as a program in a non-transitory recordable medium. The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of grouping by a User Equipment (UE), the method comprising:
   transmitting, to a server, relational data stored in the UE using a first communication mode;
   receiving, from the server, a first group information generated based on relational data of a plurality of UEs;
   generating a first group based on the first group information;
   receiving, in response to at least one new UE being connected to the server, a second group information generated based on relational data of connected UEs including the at least one new UE and the plurality of UEs corresponding to the first group information;
   generating a second group based on the second group information, wherein the first group based on the first group information is maintained without dissolution; and
   in response to identifying that the first communication mode is unusable for communication within a group based on the group information, performing a communication using a second communication mode subsequently based on a priority of a plurality of communication modes,
   wherein the plurality of UEs assign priority among the plurality of communication modes.

2. The method of claim 1, wherein the relational data comprises data included in at least one of phone contacts, calling logs, Short Message Service (SMS) logs, a Social Network Service (SNS) friend list, SNS logs, or internet search history.

3. The method of claim 1, wherein the server generates, from among the plurality of UEs, a group based on the relational data of the UEs connected with the server for a time which is equal to or greater than a certain time.

4. The method of claim 3, further comprising:
receiving, in response to a UE leaving the generated group, new group information generated based on relational data of connected UEs.

5. The method of claim 3, further comprising:
generating a plurality of groups based on the relational data of the plurality of UEs.

6. The method of claim 3, further comprising:
receiving a web page accessible from each UE included in the generated group.

7. The method of claim 6, further comprising:
compressing contents differently according to a communication mode used by a UE; and
uploading the differently compressed contents to the web page using the communication mode.

8. The method of claim 3, further comprising:
analyzing a log of the UEs included in the generated group and receiving position information or content information.

9. The method of claim 8, wherein the content information is at least one of topic information, music information, broadcast program information, or website information.

10. The method of claim 1, further comprising:
transmitting, to the server, position information of the UE; and
receiving data related to position information of the plurality of UEs.

11. The method of claim 10, wherein the data related to position information is at least one of place recommendation information, content recommendation information, or content information generated in the past at the position.

12. A User Equipment (UE), the UE comprising:
a display;
a communicator configured to transmit relational data stored in the UE using a first communication mode; and
at least one processor configured to:
  receive from a server a first group information generated based on relational data of a plurality of UEs,
  generate a first group based on the first group information,
  receive, in response to at least one new UE being connected to the server, a second group information generated based on relational data of connected UEs including the at least one new UE and the plurality of UEs corresponding to the first group information,
  generate a second group based on the second group information, wherein the first group based on the first group information is maintained without dissolution, and
  in response to the first communication mode being unusable for communication within the server group based on a group information, perform communication using a second communication mode subsequently based on a priority of a plurality of communication modes,
wherein the plurality of UEs assign priority among the plurality of communication modes.

13. The UE of claim 12, wherein the relational data is data included in at least one of phone contacts, call logs, Short Message Service (SMS) logs, a Social Network Service (SNS) friend list, an SNS log, or internet search history.

14. The UE of claim 12, wherein the server generates, from among the plurality of UEs, the group based on relational data of the UEs connected to the server for a time which is equal to or greater than a certain time.

15. The UE of claim 14, wherein the at least one processor is further configured to:
in response to a UE leaving the generated group or a new UE being connected to the server, acquire new group information that is generated based on relational data of the connected UEs.

16. The UE of claim 15, wherein, in response to a new group being generated, an existing group is maintained, without being degrouped.

17. A grouping system, the system comprising:
a plurality of UEs configured to send, to a server, relational data stored in each UE using a first communication mode; and
a server configured to generate a first group based on the relational data received from the plurality of UEs,
wherein, in response to at least one new UE being connected to the server, the server configured to generate a second group based on based on relational data of connected UEs, wherein the first group is maintained without dissolution,
wherein the plurality of UEs, in response to the first communication mode being unusable for communication within the group based on a group information, perform intercommunication using a second communication mode subsequently based on a priority of a plurality of communication modes, and
wherein the plurality of UEs assign priority among the plurality of communication modes.

18. The system of claim 17, wherein the server generates the group based on relational data of the UEs that are connected with the server for a time which is equal to or greater than a certain time, from among the plurality of UEs.

19. The system of claim 17, wherein the server provides a web page to the plurality of UEs.

20. A method of grouping by a User Equipment (UE), the method comprising:
transmitting, to a server, relational data stored in the UE including a position information of the UE using a first communication mode;
receiving, from the server, a first group information generated based on relational data of a plurality of UEs including a position information of the plurality of UEs which are included in a predetermined area;
generating a first group based on the first group information;
in response to a first UE included in the first group being out of the predetermined area, degrouping the first UE from the first group;
in response to the first UE included in the first group being relocated in the predetermined area, receiving, from the server, a past content related to the position information of the plurality of UEs included in the first group;
receiving, in response to a second UE which is not included in the first group being connected to the server, a second group information generated based on relational data of connected UEs including the second UE and the plurality of UEs corresponding to the first group information;

generating a second group based on the second group information, wherein the first group based on the first group information is maintained without dissolution; and in response to identifying that the first communication mode is unusable for communication within a group based on the group information, performing a communication using a second communication mode subsequently based on a priority of a plurality of communication modes;

wherein the plurality of UEs assign priority among the plurality of communication modes.

* * * * *